United States Patent [19]

McLeod et al.

[11] Patent Number: 6,099,318
[45] Date of Patent: Aug. 8, 2000

[54] EDUCATIONAL CARD GAME

[76] Inventors: Deandra McLeod; Scott McLeod, both of 3747 Grantham Ct., Palm Harbor, Fla. 34684

[21] Appl. No.: 09/320,390

[22] Filed: May 24, 1999

Related U.S. Application Data

[63] Continuation of application No. 09/083,145, May 21, 1998.

[51] Int. Cl.[7] .................................................. G09B 19/22
[52] U.S. Cl. .......................... 434/129; 275/302; 275/308
[58] Field of Search .................................... 273/292, 296, 273/299, 302, 306, 308; 434/128, 129, 171, 172, 176

[56] References Cited

U.S. PATENT DOCUMENTS

| | | | |
|---|---|---|---|
| 739,678 | 3/1903 | Ives | 273/292 |
| 1,558,229 | 10/1925 | Bowman | 273/296 |
| 1,617,773 | 2/1927 | Sergel | 273/307 |
| 1,666,996 | 4/1928 | Douglas | 273/299 |
| 2,154,891 | 4/1939 | Dodge | 273/296 |
| 3,937,472 | 2/1976 | Rice | 273/157 R |
| 4,369,976 | 1/1983 | Chunn | 273/303 |
| 4,470,821 | 9/1984 | LeCapelain | 434/172 |
| 5,568,924 | 10/1996 | Katsuren | 273/292 |
| 5,803,742 | 9/1998 | Buti | 434/157 |

FOREIGN PATENT DOCUMENTS

| | | | |
|---|---|---|---|
| 1603506 | 11/1981 | United Kingdom | 273/296 |
| 2229369 | 9/1990 | United Kingdom | 273/299 |

*Primary Examiner*—Robert A. Hafer
*Assistant Examiner*—Kurt Fernstrom
*Attorney, Agent, or Firm*—Joseph N. Breaux

[57] ABSTRACT

An educational card game 10 including at least one deck of cards 20 comprising a plurality of individual cards 21 having a front face 22 and a rear face 23. The rear faces 23 are provided with a generic legend 24 and selected pairs of front faces 22 are provided with a pictorial representation 25 and a descriptive legend 26, respectively, of a related species that is covered by the generic legend 24 that appears on the rear face 23 of each playing card 21.

1 Claim, 4 Drawing Sheets

EDUCATIONAL CARD GAME

This application is a continuation of Ser. No. 09/083,145 filed May 21, 1998.

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of educational games in general, and in particular to an educational card game that assists a child in reading, spelling, and logic.

2. Description of Related Art

As can be seen by reference to the following U.S. Pat. Nos. 3,302,310; 3,873,093; 4,219,197; and 4,470,821, the prior art is replete with myriad and diverse educational card games.

While all of the aforementioned prior art constructions are more than adequate for the basic purpose and function for which they have been specifically designed, they are uniformly deficient with respect to their failure to provide a simple, efficient, and practical way to educate children with regard to the distinction between a genus and a species, while also teaching reading, spelling, and the logical thought processes involved in choosing related species of a genus when depicted in both pictorial and graphic representation.

As a consequence of the foregoing situation, there has existed a longstanding need for a new and improved type of educational card game that will address all of the aforementioned shortcomings of the prior art games, and the provision of such a construction is a stated objective of the present invention.

BRIEF SUMMARY OF THE INVENTION

Briefly stated, the educational card game that forms the basis of the present invention comprises one or more decks of cards wherein each deck of cards is devoted to a generic subject matter wherein the face of the cards have pairs of related species of subject matter wherein the object of the game is to collect matched pairs of the cards dealing with the related species of subject matter.

As will be explained in greater detail further on in the specification, the card game would consist of two base card holding devices, which would be fabricated of plastic. The game would also feature several decks of cards to correspond with each level of skill, and each deck of cards would consist of approximately 30 cards. Level One is for "Alphabet/Letter Sounds/Rhyming Words"—this level would allow the child to match upper case letters to upper case letters, to match lower case letters to lower case letters, to match upper case letters to lower case letters, to match a picture to the beginning letter sound (i.e., picture of an apple matches the letter "A"), and matching rhyming words with picture (i.e., dog and a picture of dog matches front and a picture of frog). Level Two deals with matching "word to picture". This is the main level of the program to concentrate on, providing one card with a word, and the match would be the picture of the word. The categories for this level of cards are animals, colors and shapes, toys and activities, numbers, people and places, clothing, home, food, nature, etc. Level Three uses the same categories and words form Level Two, matching the "word" to the "word". This is also the level to introduce words with unique beginning letter sounds (i.e., ph, th, sh, ch, kn, wr).

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
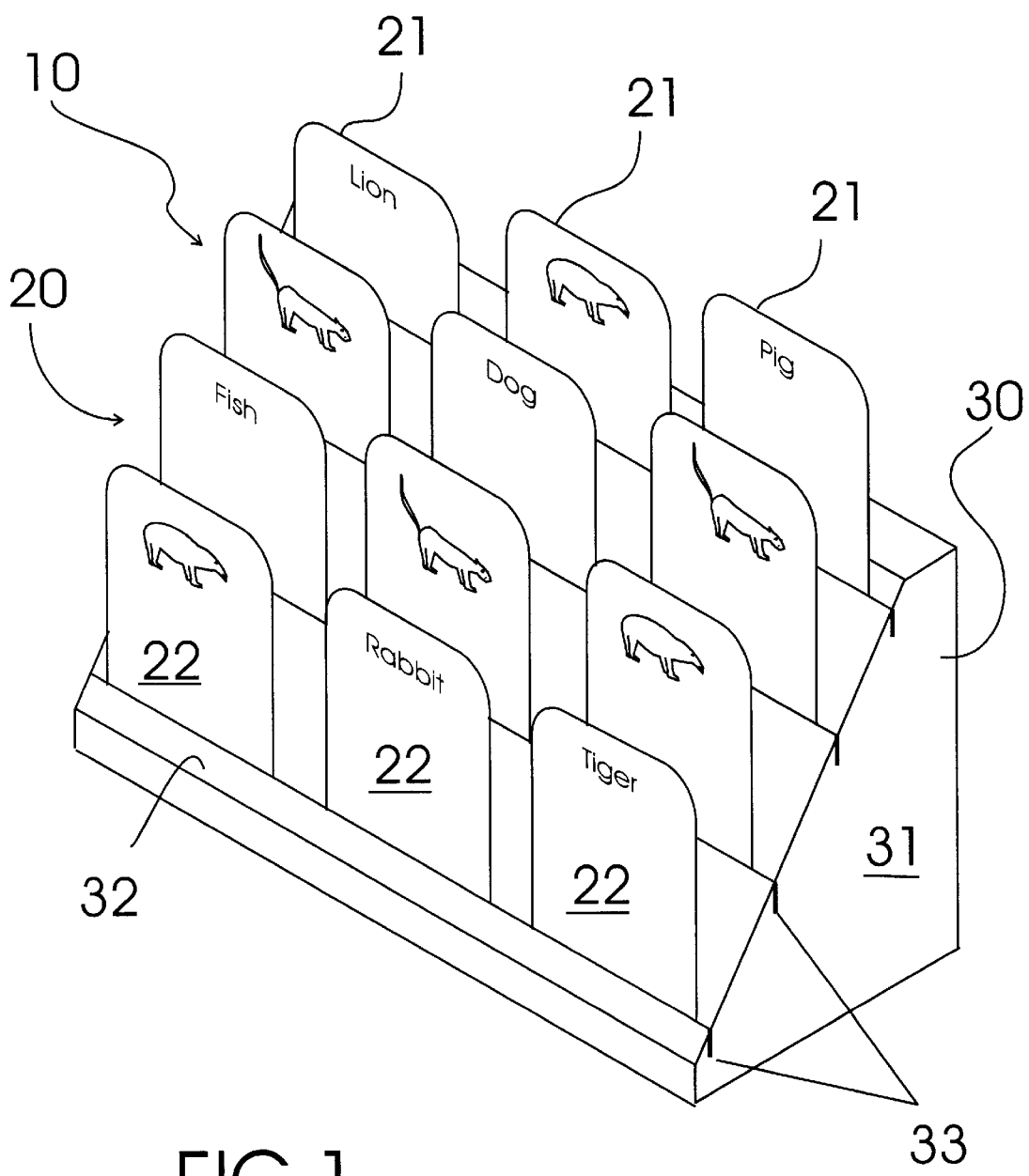
FIG. 1 is a perspective view of a portion of the educational card game disposed in a game card holder.

As can be seen by reference to the drawings, and in particularly to FIG. 1, the educational card game that forms the basis of the present invention is designated generally by the reference number 10. The card game 10 comprises in general, at least one deck of playing cards 20 and a game card holder 30 for each player.

Figure 2:
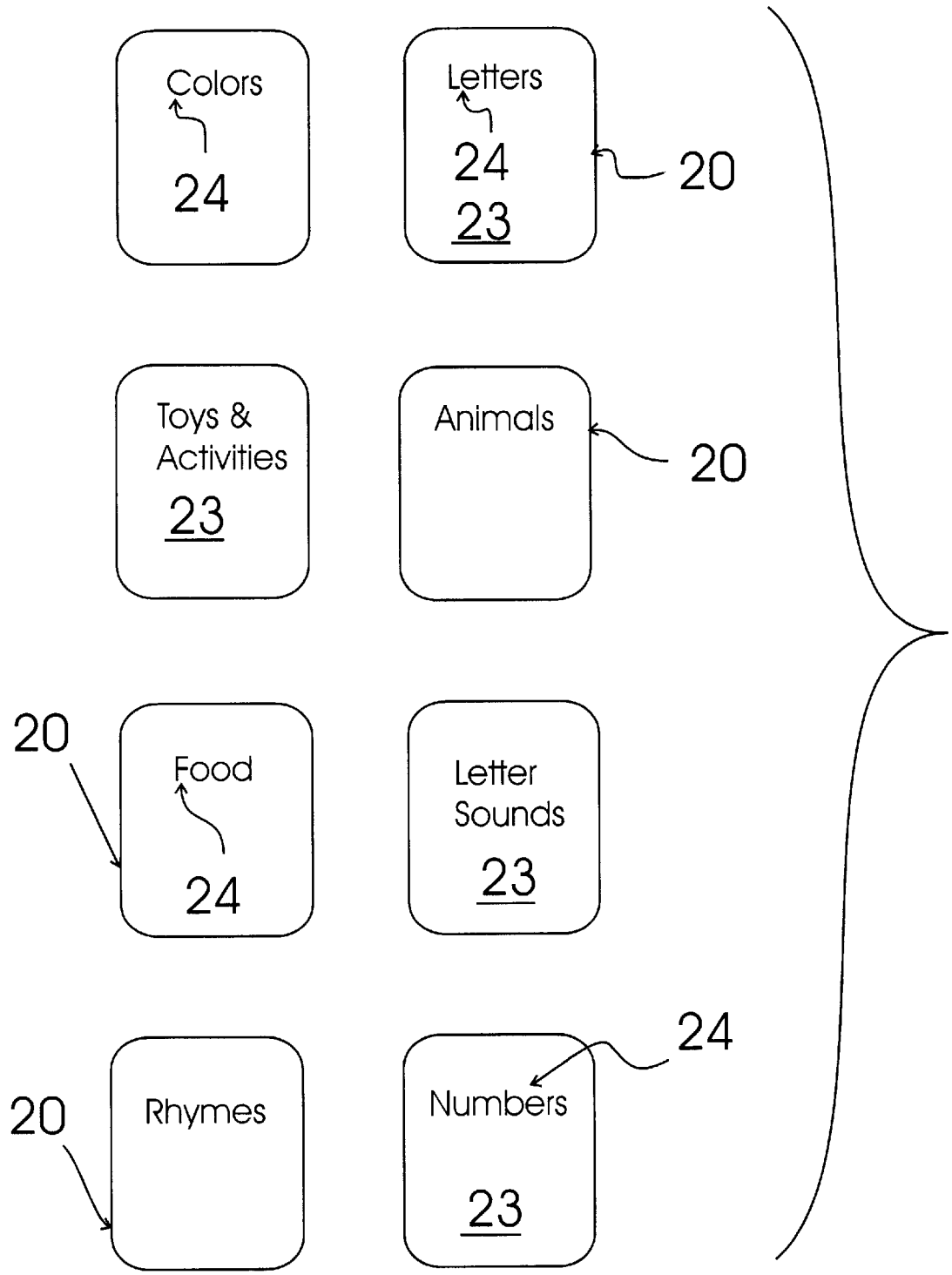
FIG. 2 is a top plan view of a plurality of decks of cards showing the generic description that is imprinted on the backs of the decks of cards.
Figure 4:
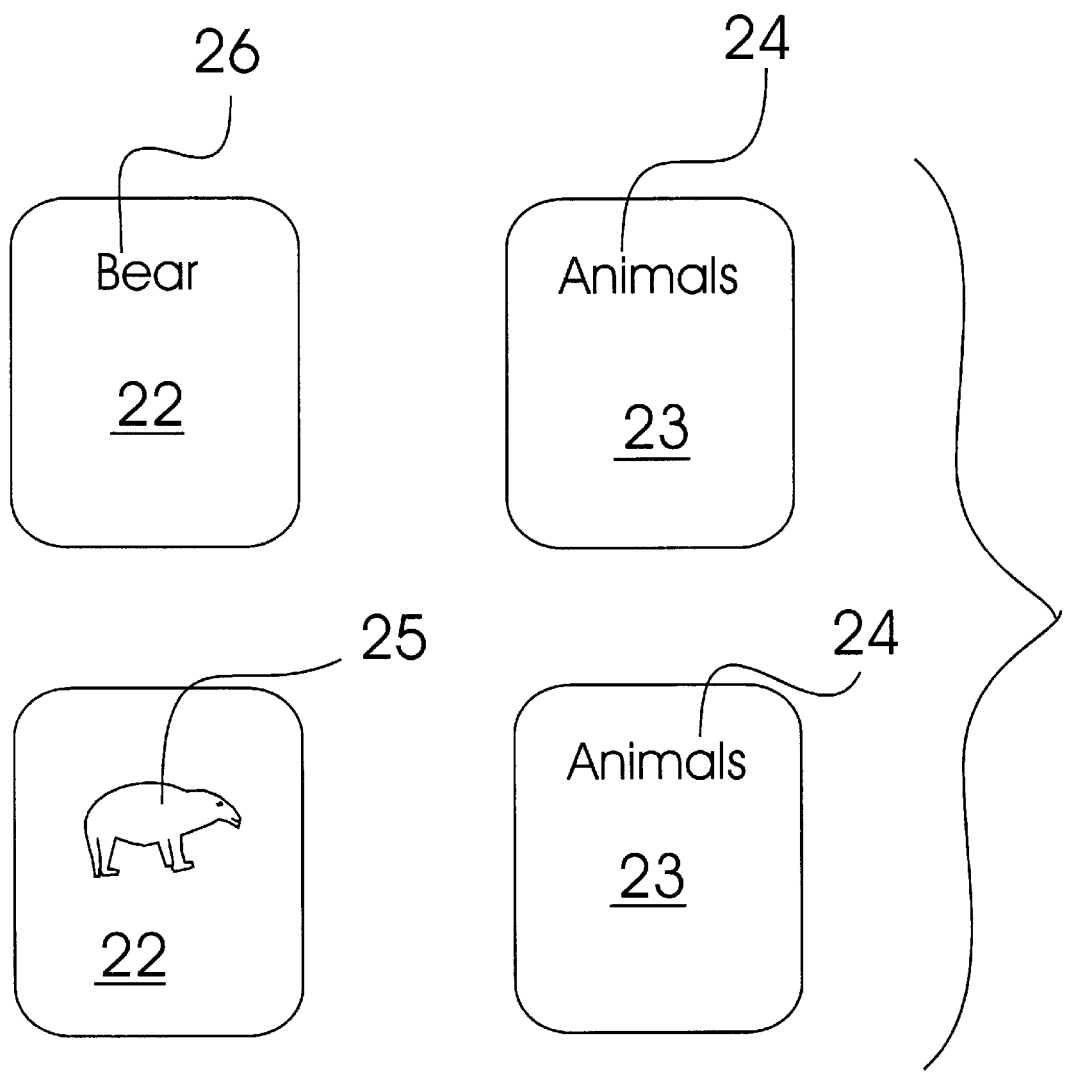
FIG. 4 shows the front and rear faces of one matched pair of cards.

As shown in FIGS. 1, 2, and 4, each deck of cards comprises a plurality of playing cards 21 wherein each card has a front face 22 and a rear face 23.

In addition, the rear face 23 of each card 21 in the deck of cards 20 has a generic legend 24 imprinted thereon which identifies a generic subject matter that is represented on the front face 22 of the playing cards 21.

Furthermore, the front faces 22 of the playing cards 21 are arranged into matched pairs of related species of the common subject matter. One of the front faces 22 of the playing cards 21 will have a pictorial representation 25 of one portion of a selected pair of related species of the common subject matter. Another of the front faces 22 of the playing cards 21 will have a printed legend 26 which identifies the other portion of a selected pair of related species of the common subject matter.

Figure 3:
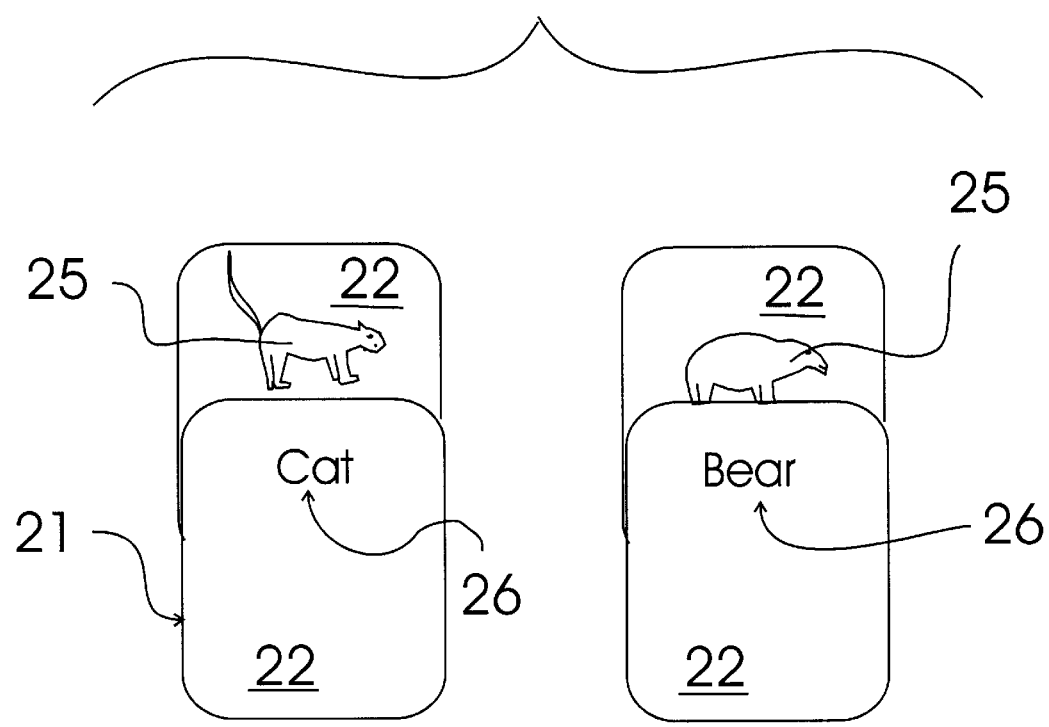
FIG. 3 shows the faces of two matched pairs of cards.

In the example illustrated in FIGS. 1,3, and 4, the generic subject matter that the deck of cards relates to is "animals" and that generic legend 24 is printed on the rear face 23 of each of the cards 21. Furthermore, one half of the front faces 22 of the deck of cards 20 are provided with a pictorial representation 25 of a different animal and the other half of the front faces 22 of the deck of cards 20 are provided with a printed legend 26 identifying a particular animal which corresponds with one of the pictorial representations 25.

Turning now to FIG. 2, wherein a plurality of decks 20 of cards 21 are depicted it can be seen that a variety of generic subject matters are intended to be covered by the individual decks of cards, such as colors, letters, toys and activities, animals, food, letter sounds, rhymes, numbers, and the like, as will be explained in greater detail further on in the specification.

Returning once more to FIG. 1, it can be seen that the game card holder 30 comprises a block of material 31 having an angled front face 32 provided with a plurality of slots 33 which are dimensioned to slidably receive a plurality of playing cards 21 such that the front face 22 of each card 21 is faced towards the player who controls those particular cards.

As was mentioned previously in the specification, this game can be played with either single or multiple decks of cards wherein the generic subject matter of each deck of cards can either be generally related to the other deck of cards or the generic subject matters of the respective deck of cards may not be even remotely related to one another depending upon the preferences of the players.

Examples of different games that can be played with the educational card game 10 of this invention are as follows.

Instructions. The card game 10 is intended to be played with two players, however, more players can be added if two decks of cards are combined. Large decks of cards are intended to be divided into smaller decks when in use, such as beginning and end of alphabet or by letters that need more reinforcement. When the beginning of a new deck of cards, practice only a few cards at a time using the matching game (so as not to frustrate the child with too many new words).

Matching. Divide the deck of cards into two equal stacks with each stack containing like cards, such as all word cards in one stack and all picture cards in the other. Player one would put one card down, stating what that card is. Player two searches for a card that matches player one's card, placing it down next to it's match. These steps would be continued until all cards have been matched, and the players would continue to alternate the stacks of cards. When successfully completed, the players would move on to the Memory game.

Memory. The cards would be shuffled and laid face down in rows. The first player turns up any two cards. While leaving the cards in the rows, the player would state what the card are. If they match, they will be picked up and the player would go again. If there is no match made, the cards would be turned down again and the other player has his turn. This would be continued until all cards have been matched. If this game were completed successfully a couple of times, the players would move on to the Draw Card game.

Draw Card. The cards would be shuffled well, each player would receive five cards. The remaining cards would be placed face down between players to be used as the "draw" pile. The five cards would be placed into the individual card holders so that each player would not be able to see the other player's cards. If the player has a match, he would state what it is and put it down for all to see. The first player would say, "do you have a ___", (asking for a card that they need to make a match). If player two has the card asked for, then they would give it to player one and player one would go again.

If player two does not have the card, then he would say "draw", and player one would take a card from the extra card deck. If the card drawn were the requested card, the player would say the match aloud and go again. If there is no match made, it would be player two's turn, and the game would continue in this fashion until all matches have been made. If at any time throughout the game a player runs out of cards, that player is to draw two cards from the top of the "draw" pile. Once all matches have been made, each player should read their own cards aloud and then the other player's card aloud. If this game is completed successfully a couple of times, then it is time to move on to a different category of cards.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A method of playing an educational card game comprising the steps of:

a) providing a plurality of decks of playing cards wherein each deck of playing cards includes a plurality of individual playing cards wherein each playing card in a particular deck of playing cards has a front face and a rear face wherein a generic legend is imprinted on the rear face of each playing card and the front faces of selected pairs of playing cards are provided with a pictorial representation and a descriptive legend, respectively, of a particular species that falls within the particular generic legend that is imprinted on the rear faces of all of the playing cards in one of the plurality of decks of playing cards;

b) playing a matching round including the steps of 1) dividing a deck of playing cards into two equal stacks containing like cards, 2) a first player putting one card down from one of the two equal stacks and stating what that card is, 3) player two searching through the remaining equal stack for a card that matches the one card down and placing the card that matches next to the one card down, and 4) repeating steps b)1,b)2 and b)3 until all cards in the two equal stacks have been matched, the player with the most matched pairs being awarded one point;

c) playing a memory round including the steps of 1) shuffling the deck of playing cards and dealing the playing cards down in a number of rows, 2) a first playing turning over two of the playing cards in an attempt to math the two playing cards turned over, 3) a first player continuing to turn over two cards at a time until no match is achieved, 4) a second player turning over two playing cards in an attempt to match the two laying cards, 5) the second player continuing to turn over two cards at a time until no match is found, and 6) repeating steps c)2,c)3,c)4, and c)5 until all of the playing cards have been matched, the player with the most matched pairs being awarded one point;

d) playing a draw card round including the steps of: 1) shuffling the deck of playing cards, dealing five cards to each player and then placing the remaining cards down in a stack, the players play in order each player playing according to the following steps 2) when the player has a match he puts its down face up, 3) when the player does not have a match he asks another player for a specific card, should the asked player have the requested card the requested card is given to the player who asks for it, should the asked player not have the requested card the asking player is directed to draw from the stack in an attempt to retrieve the requested card, if the requested card is drawn, the player repeats play of step d)3, when the requested card is not drawn play is passed to the next player until all cards have been matched, the player with the most matched pairs being awarded one point; and e) announcing the winner to be the player with the most points.

* * * * *